United States Patent [19]

Perry et al.

[11] Patent Number: 4,985,551
[45] Date of Patent: Jan. 15, 1991

[54] PROCESS FOR PURIFICATION OF CATALYSTS FROM POLYOLS USING ION EXCHANGE RESINS

[75] Inventors: John G. Perry, Hackettstown, N.J.; Walter A. Spelyng, Baton Rouge, La.

[73] Assignee: BASF Corporation, Wyandotte, Mich.

[21] Appl. No.: 291,558

[22] Filed: Dec. 29, 1988

[51] Int. Cl.$^5$ ............................ C07G 3/00; C07H 1/00; C08B 37/00
[52] U.S. Cl. .................................. 536/18.6; 536/120; 536/4.1
[58] Field of Search ............... 536/18.6, 120; 568/621, 568/620

[56] References Cited

U.S. PATENT DOCUMENTS 3,823,145  7/1974  Louvar et al. ...................... 568/621
4,355,188  10/1982  Herold et al. ...................... 536/120
4,535,189  8/1985  Cuscurida ............................ 568/620

Primary Examiner—Ronald W. Griffin
Assistant Examiner—Everett White
Attorney, Agent, or Firm—Bill C. Panagos; Cary W. Brooks

[57] ABSTRACT

A process for the ion exchange of polyols for catalyst removal wherein said catalyst is an alkali hydroxide or alkoxide comprising the sequential steps of:

(a) mixing the polyether molecule having a molecular weight of 500–10,000 with water, (b) blending into the product of (a) a sufficient amount of a lower aliphatic alcohol to break the emulsion formed in step (a), (c) passing the product of step (b) through a macroporous cation exchange resin to obtain a purified polyether molecule, methanol, and water.

The product of (c) may be further subjected to stripping to produce the purified polyether polyols.

6 Claims, No Drawings

PROCESS FOR PURIFICATION OF CATALYSTS FROM POLYOLS USING ION EXCHANGE RESINS

BACKGROUND OF THE INVENTION

1. Field of the Invention

The present invention relates to the use of strongly acidic cation exchange resins to reduce polyol catalyst concentrations to less than 1 part per million.

2. Description of the Related Art

Cuscurida et al, U.S. Pat. No. 4,535,189 disclose filter cakes formed by the filtering of a alkylene oxide polymer during the refining of the alkylene oxide polymer which contains a minor amount of alkylene oxide polymer which can be recovered therefrom by treating the filter cake with a lower aliphatic alcohol or an aqueous solution of aliphatic alcohol. It is preferred that methanol be the lower aliphatic alcohol. Cuscurida relates to an improved purification process wherein a filtration step is utilized as part of the purification sequence. It has been discovered in accordance with Cuscurida that in a process of this nature, the polyol that is occluded in the filter cake formed by the filtration step may be separately recovered therefrom by treating the filter cake with a lower aliphatic alcohol or an aqueous solution of such lower aliphatic alcohol. The alkylene oxide polymer has an average molecular weight of about 500 to 10,000 and can be recovered from the filter cake with an aqueous solution.

Louvar et al, U.S. Pat. No. 3,715,402 disclose a method for the removal of water insoluble impurities from water insoluble polyethers. The process comprises providing a mixture of water, polyether, a solvent in which the polyether is soluble, and an acid. The solvent has a density which is different than water and which is inert with respect to the polyether in water and is substantially immiscible in water. The acid is used in an amount sufficient to adjust the pH of the mixture to a pH of about 8 and when this is done, the polyether solvent is then separated from the water by a method such as electrostatic coallescence or subjugation centrifugal force. A stream of water containing dissolved water soluble impurities and a stream polyether solvent solution are separately recovered after the separation followed by separating the solvent from the polyether solvent solution.

Louvar et al, U.S. Pat. No. 4,137,396 disclose improvements in the process for the removal of residual catalysts from polyether polyols by use of a solvent wash and recovery system. Specifically, Louvar et al do disclose ion exchange techniques for the removal of catalysts but teach that such is not a satisfactory method for the removal of catalysts residue from polyols. Rather, Louvar et al disclose the use of adsorbents, such as "MAGNESOL" sold by Reagent Chemicals, which are employed in an aqueous mixture of water and crude polyol at temperatures ranging from 30°-120° C. The resulting mixture is spray washed and then cycled through a filter until sufficient filter cake is deposited on the filter and a catalyst refiltrate containing the polyol is obtained.

Kablitz et al, U.S. Pat. No. 4,476,297 disclose a process for the removal of catalyst residues from polyolefins which contain titanium and light metal halides and aluminum compounds. These impurities can be reduced by treating the polyolefin with a higher, preferably branched, aliphatic monocarboxylic acid having 6 to 10 carbon atoms. The present invention is not directed to purification of polyolefins and does not utilize aliphatic monocarboxylic acids.

Louvar et al, U.S. Pat. No. 3,823,145 disclose a process for purifying polyoxyalkylene ether polyols containing water soluble residual catalysts which comprises providing a mixture of water, polyol and solvent together with the polyol forms a water immiscible solution. The solution is subjected to centrifugal separation whereby the polyol solvent solution is separated from the water layer and the purified polyol is recovered from the polyol solvent solution by stripping off the solvent.

The present invention relates to the use of strongly acidic cation exchange/resins to reduce the polyol catalyst in the polyoxyalkylene polyol to a concentration of less than about 1 ppm. None of the art, alone or in combination, insofar as is known, discloses the process of the present invention.

SUMMARY OF THE INVENTION

The present invention is a method which allows greater mass transfer of a polyol catalyst to exchange sites on an ion exchange resin. In general, the polyether molecules containing the catalyst component are quite large with regard to molecular weights. Specifically, such polyether molecules have weights which range from about 500 to 10,000. Previously, the efficiency of making the direct catalyst hydrogen conversion via ion exchange was described as being quite low. A major factor in this low exchange rate was the inhibition of mass transfer of the polyether molecules through the pores of an ion exchange resin bead to the active ion exchange sites. This inhibition is directly related to the size of the molecule containing the catalyst impurity to be exchanged. The present invention allows for the removal of catalyst via a greatly improved mass transfer rate by reducing the size of the molecule that must access the active ion exchange sites. This is accomplished in a three step method whereby the polyether molecule with the catalyst impurity is contacted with water to form a semi-purified polyether molecule with the catalyst impurity in association with the polyether molecule and water. In the second step, the polyether molecule catalyst exchange complex is blended with a lower aliphatic alcohol, preferably methanol, until clear. In the final step, the blended polyol is contacted with a macroporous cation exchange resin, which may be in a bed or a column, where the molecule accesses the ion exchange sites and results in a purified polyether molecule, water, methanol, and the complete transference of the catalyst impurity to the ion exchange site. The process of the present invention is useful in removing potassium catalysts from polyether polyols, but it is contemplated that it would find application where any Group I or Group II alkali metal or alkoxide is used as a catalyst for the formation of a polyether polyol.

DETAILED DESCRIPTION OF THE PREFERRED EMBODIMENT

The present invention is directed to a process for the catalyst removal of alkali earth metal catalysts from polyether polyols via a macroporous cation exchange resin. It has been discovered that strongly acidic cation exchange resins may be used to efficiently reduce polyol catalyst impurities to a concentration of less than 1 ppm.

In general, the impurities present in the polyol are catalysts used in the preparation of the polyol. These catalysts are generally alkali metal hydroxides or alkali metal alkoxides such as sodium hydroxide, potassium hydroxide, sodium alkoxide, potassium alkoxide, and mixtures thereof. Although these are the most common catalysts, it is contemplated that the process of the present invention may be used to remove any alkali earth metal hydroxides or alkoxides formed using Group I and Group II metals. Additional catalysts which may be employed in the preparation of such polyols which are removable by the instant process include the hydroxides and alkoxides of lithium, rubidium and cesium.

Generally speaking, the polyols purified in accordance with the present invention include those polyols prepared by condensing monomeric units such as ethylene oxide, propylene oxide, butylene oxide, and mixtures thereof with active hydrogen compounds such as ethylene glycol, propylene glycol, water, dipropylene glycol, trimethylene glycol, 1,2-butane diol, 1,3-butane diol, 1,4-butane diol, hexene triol, glycerol, trimethylolpropane, trimethylolethane, hydroquinone, ethylene pentaerythritol alpha-methyl glucoside, sorbitol, sucrose, diamine, diethylene triamine, toluene diamine, aniline, methylene dianiline, piperazine, tri-isopropanol amine, and bis phenol A where these polyols have a molecular weight range from about 500 to about 10,000.

Included are those polyols which are characterized essentially hydroxy terminated polyether polyols which have the general formula:

$$H(OR)_nOH$$

wherein R is an alkylene radical and n is an integer which in a preferred embodiment is sufficiently large that the compound, as a whole, has a molecular weight of from about 500 to 10,000. These would include polyoxyethylene glycol, polyoxypropylene glycol, polyoxybutylene glycol, and polytetramethylene glycol. Other typical polyols include block copolymers such as combinations of polyoxypropylene and polyoxyethylene glycols, more specifically, those having the general formula:

$$HO(C_2H_4OH)_n(C_3H_6O)_m(C_{(C_2H_4O_2)_n}H$$

wherein n and m are together sufficient for the attainment of the minimum molecular weight which is about 500. Also included are copolymers of poly-1,2-oxybutylene and polyoxyethylene glycols and poly-1,4-oxybutylene and polyoxypropylene glycols and random copolymer glycols prepared from blends of sequential addition of two or more alkylene oxides as well as glycols as described above which are capped with ethylene oxide units. The polyols purified in accordance with this invention can contain arylene or cycloalkylene radicals together with the alkylene radicals. In such products, the cyclic groups inserted in a polyether chain are preferably phenylene, naphthalene, or cyclohexylene radicals or those radicals containing alkyl or alkylene substituents such as tolylene, phenylethylene, or xylene radicals.

Although limited, there have been some past attempts at using ion exchange resins as a method of polyether catalysts removal. The key problem encountered in these past efforts has been one of low ion exchange bed efficiency. In other words, in order to reduce the catalyst level of a polyol to an acceptable concentration i.e. less than about 5 parts per million, the amount of ion exchange resin required would be quite large relative to the amount of polyol that the resin could treat. Therefore, a process to remove catalysts via ion exchange has been generally viewed as impractical as well as uneconomical.

The present invention overcomes these shortcomings by providing for an efficient removal of polyether catalysts via ion exchange resins. The present invention is based upon a process which allows greater mass transfer of the polyol catalyst to the exchange sites on the cation ion exchange resin. The cation exchange resins which are useful in the present invention are the macroporous cation resins available through several resin vendors. Of specific use is the Amberlyst 15 resin manufactured by the Rohm and Haas Corporation. Amberlyst 15 is a strongly acidic resin and can be employed for diverse nonaqueous cation exchange reactions as are involved in removal of ammonium or amine from hydrocarbons, the removal of iron from glacial acidic acid and the removal of copper ions from hydrocarbon solvents. The resin is a bead formed of strongly acidic resin developed particularly for heterogeneous acid catalysis of a wide range of organic reactions in nonaqueous media. The resin is also useful in nonaqueous ion exchange in systems from which removal of cationic impurities is desirable. Although Amberlyst 15 is the resin which has been identified in this application, it is accepted that other cationic exchange resins available from other manufacturers would perform equally well.

In the formation of polyether polyols, it is known to use alkali metal hydroxides as catalysts in the formation thereof. These catalysts, particularly potassium hydroxide, are an impurity which should be removed from the polyether molecule in order to render it suitable for use in other applications. The present invention is directed to the use of a macroporous cation exchange resin to reduce the amount of catalyst contaminant to less than 1 part per million.

In general, the polyether polyols containing the catalyst component, i.e. $K^+$, are quite large with molecular weights ranging from 500 to 10,000.

The efficiency of making a direct $K^+$ to $H^+$ conversion via ion exchange was previously quite low. The major factor in this low exchange rate was the inhibition of the mass transfer of the polyether molecules through the pores of the resin beads to the active ion exchange sites. This inhibition was directly related to the size of the molecule containing the alkali metal to be exchanged. The present invention is a new method for catalyst removal which allows for a greatly improved mass transfer rate by reducing the size of the molecule that must access the active ion exchange sites. This is accomplished by the following procedure:

(a) $R\text{-}K^+ + H_2O \rightarrow R\text{-}H^+ + KOH$ (b) $R\text{-}H^+ + KOH + \text{Alcohol}$ are blended until clear.

(c) $R\text{-}H^+ + KOH + \text{Alcohol} + \text{Resin-}H^+ \rightarrow R\text{-}H^+ + H_2O + \text{Alcohol} + \text{Resin-}K^+$.

In the practice of the present invention, the polyether polyol which contains the alkali metal catalyst impurity is put in water present in an amount of from 1 to 8 percent by weight of the total solution water, and an ion transfer occurs between the polyether polyol containing the catalyst to be removed and the water, and an emulsion is formed. A lower aliphatic alcohol such as methanol is added to the product of the first step to break the emulsion, and the mixture is blended until clear. In the third step, the blended polyether-wateralcohol mixture is passed over a strongly acidic macroporous cation exchange resin, either in column or bed form, whereby there is a direct ion exchange between the purified polyether blended form and the active ion exchange sites in the resin so that the alkali earth metal is bonded to a cation exchange site and what is retrieved from the bottom of the column is the purified polyether molecule, water, and lower aliphatic alcohol. The purified polyether molecule is then separated from the water and lower aliphatic alcohol mixture by standard stripping procedures to render a purified polyether molecule. This system generally allows for greater than 50 percent of the capacity of the resin bed to be utilized before the concentration of the alkali earth metal in the bed effluent reaches 1 ppm.

Although the transfer of potassium of the alkali metal catalyst to a significantly smaller molecule such as potassium hydroxide has been accomplished via the reaction step (a), the resulting product mixture forms an emulsion. If the emulsion were allowed to contact the resin bed, it would be mass transfer limited due to the nonhomogeneous nature of the emulsion. The addition of an another component, a lower aliphatic alcohol, such as methanol, in step (b), acts to break the emulsion and allow the formation of a homogeneous solution as well as the generation of a lower molecular weight medium of exchange. As a result, the potassium hydroxide molecules are allowed easy access to the active ion exchange sites within the resin. The final product mixture of step (c), as previously stated, needs only to be stripped of the water generated by the exchange and the lower aliphatic alcohol diluent. The present invention offers the advantage of increased utilization of the ion exchange bed capacity and efficiency than anything previously known in the art.

As previously stated, a lower aliphatic alcohol, such as methanol is used as a diluent to break the emulsion into a homogeneous solution. Any lower aliphatic alcohol such as ethanol, propanol, butanol, isopropanol, pentanol, etc., may be utilized.

The following examples are offered to illustrate various aspects of the present invention. Those skilled in the art understand that they are not to be construed as limiting the scope and spirit of the invention.

EXAMPLES

The following two examples demonstrate the advantages of using the discussed system to purify polyether polyols.

Example 1 A 3,000 molecular weight glycerine initiated polyol (unpurified) with 12% ethylene oxide in a heteric configuration and capped with propylene oxide was blended with methanol to 50 volume percent, heated to 150° F., and passed through a column of Amberlyst ® 15 at a flow rate of 0.15 bed volumes/minute.

Result: The concentration of catalyst in the polyol/methanol effluent remained below 1 ppm until 21% of the bed's capacity had been utilized.

Example 2 A 3,000 molecular weight glycerine initiated polyol (unpurified) with 12% ethylene oxide in a heteric configuration and capped with propylene oxide was blended with 4 weight percent water. The resulting polyol/water emulsion was then blended with methanol to an overall dilution of 50 volume percent. All other treatment conditions remained the same as in Example 1.

Result: the concentration of catalyst in the polyol/water/methanol effluent remained below 1 ppm until 54% of the bed's capacity had been utilized.

As shown above, the introduction of water in Example 2 resulted in an increase in utilization of the bed's capacity from 21% to 54%. This represented a 157% increase in efficiency of the ion exchange system as well as significant savings in time and resin required to perform the exchange.

The embodiments of the invention in which an exclusive privilege or property is claimed are defined as follows:

1. A process for the ion exchange of polyols for catalyst removal wherein said catalyst is an alkali hydroxide or alkoxide comprising the sequential steps of:
   (a) mixing the polyether molecule having a molecular weight of 500–10,000 with sufficient water to form an emulsion,
   (b) blending into the product of (a) a sufficient amount of a lower aliphatic alcohol to break the emulsion formed in step (a),
   (c) passing the product of step (b) through a macroporous cation exchange resin to obtain a purified polyether molecule, alcohol, and water.

2. The process of claim 1, wherein the product of (c) is further subjected to stripping to remove the lower aliphatic alcohol and water.

3. The process of claim 1, wherein the lower aliphatic alcohol is selected from the group consisting of methanol, ethanol, propanol, isopropanol, butanol, pentanol, and mixtures thereof.

4. The process of claim 1, when the lower aliphatic alcohol is methanol.

5. The process of claim 1, wherein the water is present in an amount of from about 1 to 8 percent by weight.

6. The process of claim 1, wherein (c) is conducted in a column.

* * * * *